Figure 1:
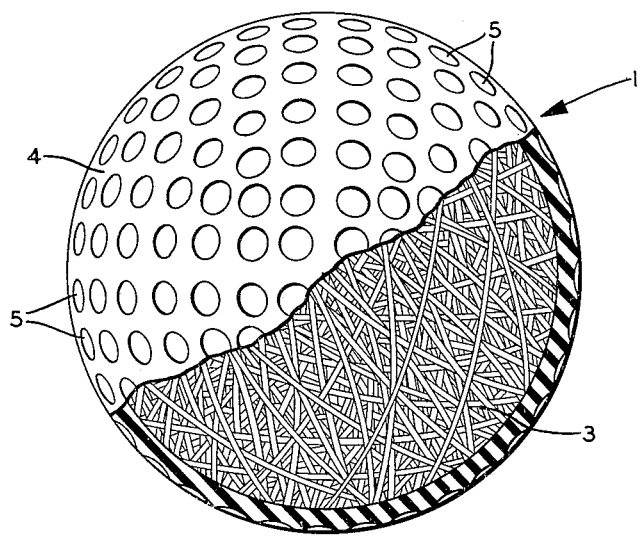

Aug. 22, 1961 R. F. SMITH 2,997,302
GOLF BALL
Filed Sept. 7, 1956

INVENTOR.
Robert F. Smith
BY Frease & Bishop
ATTORNEYS

United States Patent Office 2,997,302
Patented Aug. 22, 1961

2,997,302
GOLF BALL
Robert F. Smith, Elyria, Ohio, assignor, by mesne assignments, to Comptometer Corporation, Chicago, Ill., a corporation of Illinois
Filed Sept. 7, 1956, Ser. No. 608,465
9 Claims. (Cl. 273—235)

The invention relates to golf balls and more particularly to a golf ball cover construction which eliminates painting.

Golf balls have previously been made by preparing a center and surrounding the center by winding a layer of rubber thread thereon to form a core. Usually this core is then enclosed in a cover which is substantially composed of balata or the like. The balata, however, readily oxidizes if not protected, resulting in inferior appearance and mechanical properties.

To overcome this, such balls are always painted, as painting the ball decreases or retards oxidation and attack from the sun. However, painting the ball is an added expense and may reduce its accuracy in flight. The paint may round the corners where the surfaces of the dimple impressions intersect the outer spherical surface of the cover, causing the indicated inaccuracy.

The elimination of painting is also important in that it is impossible, as a practical matter, to apply several coats of paint and obtain uniform paint thickness on the entire outer surface of the ball, including the dimple impressions. These variations in paint thickness may result in weight eccentricities which reduce the accuracy of the ball in flight and also in putting.

Moreover, the elimination of paint from the surface of the golf ball increases uniformity in dimple shape with sharp corners maintained so that the dimples retain uniform wind resistance, thereby keeping the ball in a truer and straighter pattern of flight.

Also, the cost of painting is substantial and therefore increases the manufacturing cost of the ball.

Finally, in the use of golf balls at driving ranges the paint is frequently worn off as a result of continuous use. This requires, as a matter of maintenance, that the balls be frequently repainted.

I have discovered a solution to these problems which, in essence, eliminates painting, provides a cover construction which is resistant to attack from the sun and/or oxidation, and provides a tough and durable cover, white throughout its thickness, which eliminates repainting in use.

Accordingly, it is an object of the present invention to provide a new golf ball cover construction which is tough and durable, resistant to and not subject to attack from the sun or oxidation.

Also, it is an object of the present invention to provide a new golf ball construction which is truer in flight and rolls truer and straighter in putting.

Moreover, it is an object of the present invention to provide a new golf ball construction in which the dimples and spherical outer surface intersect with sharp corners to maintain uniform dimple wind resistance in flight.

Also, it is an object of the present invention to provide a new golf ball construction including an antioxidant, and a sun proofing material, thereby eliminating the necessity of painting.

Moreover, it is an object of the present invention to provide a new golf ball cover construction, white throughout the thickness of the cover, in which cover painting is eliminated, thereby eliminating weight eccentricity in the outer regions of the ball, due to nonuniform paint thickness.

Finally, it is an object of the present invention to provide a new golf ball construction which incorporates the foregoing desiderata, which may be manufactured with ease, which satisfactorily solves the complicated problems and avoids the difficulties that have existed in the art, and which obtains the foregoing advantages and results in an effective, simple and inexpensive manner.

These and other objects and advantages apparent to those skilled in the art from the following description and claims may be obtained, the stated results achieved, and the described difficulties overcome by the improvements, combinations, compositions, constructions, and elements which comprise the present invention, the nature of which is set forth in the following general statement, a preferred embodiment of which—illustrative of the best mode in which applicant has contemplated applying the principles—is set forth in the following description and drawing, and which are particularly and distinctly pointed out and set forth in the appended claims forming part hereof.

The nature of the discoveries and improvements may be stated in general terms as including a golf ball having a resilient, spherical center element, a rubber thread winding surrounding said resilient center element, an unpainted cover surrounding the thread winding, the unpainted cover including balata, preferably natural rubber, preferably high styrene butadiene, an anti-oxidant, sun proofing material, coloring matter such as titanium dioxide and a toughener such as hydrated alumina.

Figure 2:
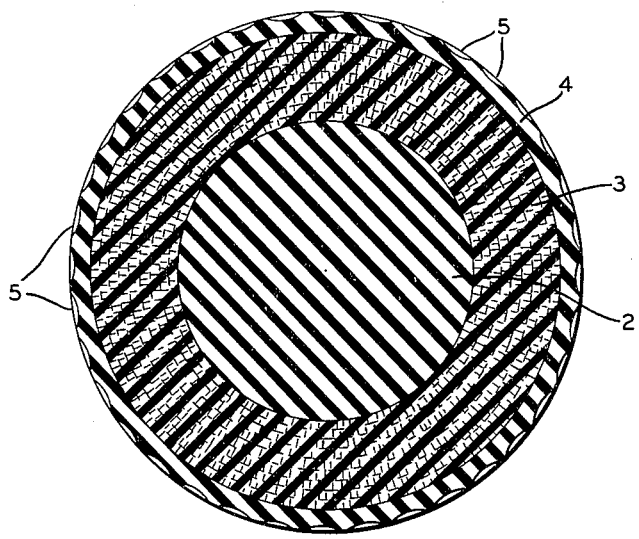

By way of example, a preferred embodiment of the improved golf ball construction is illustrated in the accompanying drawing forming part hereof, wherein:

FIG. 1 is a side elevation of the improved golf ball with part of the cover broken away; and FIG. 2 is a cross section of the golf ball illustrated in FIG. 1.

Similar numerals refer to similar parts throughout the figures of the drawing.

The improved golf ball is illustrated generally at 1 and includes a center element 2, thread windings 3, and a cover 4 provided with the usual dimples 5.

In accordance with the present invention, the center 2 is made of a usual rubber compound and may be either solid or have a liquid center as is sometimes used. The thread winding 3 is composed of usual rubber thread material and is wound or wrapped around the center 2 under uniform tension.

The cover 4 in accordance with the invention, is composed of balata, preferably natural rubber, preferably high styrene butadiene, an antioxidant, sun proof wax, white coloring matter such as titanium dioxide and a toughener such as hydrated aluminum.

Heretofore, it has been thought impossible or impractical to incorporate an antioxidant in golf ball covers. Should an antioxidant be present in the cover of a painted golf ball, the antioxidant would migrate through the cover to the outer painted surface. Even the thread windings which form part of the core, have severe composition limitations specifically requiring that antioxidants cannot be present in the winding, as an antioxidant present in the rubber thread bleeds through the cover and causes the same undesirable results as if present in the cover.

The antioxidant that migrates to the painted surface reacts with the paint on said surface; and the result of this reaction is that the paint discolors and turns black. The presence of an antioxidant also retards the drying of the paint. For this reason, antioxidants have never been used and it has never been possible to use the same to protect painted balata golf ball covers from oxidation.

I have found that an antioxidant may be included in a golf ball cover to protect the cover from oxidation. I have further found that with the addition of a sun proofing wax, attack from the sun, which is commonly known as surface checking, is essentially eliminated. The inclusion of the antioxidant and sun proofing wax along with a white coloring material, described below, eliminates the necessity of painting. The use of an antioxidant also increases balata aging qualities and thus renders the cover stock age-resistant so that it lasts for years rather than a few months, before cracking.

High styrene butadiene is a synthetic rubber material which has essentially the same physical and mechanical properties as balata or as natural rubber. It has unusual impact resistance, it is resistant to water absorption, and it is unaffected by antioxidants. By incorporating the high styrene butadiene, the cost of the cover is substantially reduced. It is therefore desirable to use as much high styrene butadiene as possible.

The coloring matter used in accordance with the present invention is preferably titanium dioxide. The titanium dioxide imparts a white color throughout the cover which along with the use of the antioxidant, eliminates the necessity of painting.

A toughener, preferably hydrated alumina, which imparts durability and toughness is also highly desirable in golf ball covers.

A master batch is compounded containing at least 30% natural rubber and up to 70% high styrene butadiene. This is used to replace a portion of the balata in the cover stock to reduce the cost thereof. The master batch may have more natural rubber and less high styrene butadiene, depending upon the quality of product desired. Also the master batch may be eliminated and balata used solely to produce the finest product where cost is of secondary importance.

Typical examples of the golf ball cover construction using a master batch in accordance with the invention are given in the following formulas:

Example 1 (X–20)

| Components: | Quantity, ounces |
| --- | --- |
| Balata | 12 |
| Master batch | 14 |
|   30% natural rubber. | |
|   70% high styrene butadiene. | |
| Antioxidant | 0.23 |
| Sun proof wax | 0.46 |
| Sulphur | 0.125 |
| Accelerator | 0.1875 |
| Zinc | 0.75 |
| Hydrated alumina | 1.6 |
| Ti–O$_2$ | 4.4 |
| Ti RCHT | 3.2 |

Ti RCHT, sometimes called Titanox RCHT, is a trademark for a compound consisting of 30% TiO$_2$ and 70% CaSO$_4$.

Example 2 (X–21)

| Components: | Quantity, ounces |
| --- | --- |
| Balata | 13 |
| Master batch | 13 |
|   30% natural rubber. | |
|   70% high styrene butadiene. | |

(Remaining components same as in Example 1.)

In the formulation, the high styrene butadiene may be one sold under the trade name "Good-Rite Resin 50"; the antioxidant may be one sold under the trade name "Wing-Stay S" and comprising alkyl aryl (styrenated) phenol; and the sun proof wax may be a hydrocarbon wax sold under the trade name "Ross Sunproofing Wax #1343," having the following average analysis:

| | |
| --- | --- |
| Melting point (drop method) | 164° |
| Melting point (Amerwax, June 1955) | 161° |
| Flash point (C.O.C.) | 485° |
| Specific gravity @ 77° F. (Amerwax, June 1955) | .917 |
| Acid value (Amerwax, June 1955) | Nil |
| Saponification value (Amerwax, June 1955) | 1.0 max. |
| Insolubles (Amerwax, June 1955) | Nil |
| Cloud point | 160° |
| Viscosity @ 210° F. Saybolt Universal | 56 |
| Empirical formula | C$_n$H |
| Color—Lovibond 25.4 mm. Cell (10R+Y) | 12 |
| Color—Natl. Pet. Assn. (N.P.A.) | 1–1½ |

The master batch rather than comprising 30% natural rubber and 70% high styrene butadiene may comprise 33⅓% and 66⅔% or 60% and 40% respectively of such components. Where more natural rubber is contained in the master batch, more master batch can be used with less balata. The only limitation is that the amount of high styrene butadiene must not be such as to result in brittleness.

The improved cover stock of the invention is compounded in the usual manner on a rubber mixing mill and is extruded through a tubing machine to form a long cylindrically shaped column. The cylindrical column is then cut into slugs large enough to provide sufficient material to form a half shell for the ball. The slugs are molded into half shells by preheating the slugs and pressing them in a cold forming mold.

A core with a center and thread windings is then enclosed in two half shells. The core enclosed in the two half shells is then placed in a preheated compression type hydro molding press. The enclosed core is then heated under low pressure, and finally cooled under high pressure to mold the ball with a dimpled surface. The excess flash is then trimmed from the formed ball. Finally, the ball is washed and inspected.

The molded ball is preferably vulcanized, although it is not necessary. This vulcanization may be accomplished during the pressing operation or may be done after the pressing operation. The purpose of vulcanization is to toughen the cover and eliminate tackiness.

Accordingly, the present invention provides a new golf ball construction including a cover which is white throughout its thickness, tough, durable, and resistant to oxidation, but does not require painting, resulting in decreased manufacturing cost, improved controllability and greater accuracy in flight, and greater accuracy and trueness in putting; provides a new golf ball construction incorporating the foregoing elements, combinations, compositions and constructions accomplishing the described new results, avoiding difficulties, and eliminating long standing problems in the art; and provides a golf ball construction which may be fabricated readily in a simple, effective and inexpensive manner.

In the foregoing description, certain terms have been used for brevity, clearness and understanding; but no unnecessary limitations are to be implied therefrom, beyond the requirements of the prior art, because such terms are used for descriptive purposes herein and not for the purpose of limitation, and are intended to be broadly construed.

Moreover, the embodiment of the improved construction illustrated and described and the examples given are by way of example, and the scope of the present invention is not limited to the exact details of construction of the various parts.

Having now described the features, discoveries and principles of the invention, the manufacture and examples of preferred embodiments thereof, and the advantageous, new and useful results obtained thereby; the new and useful improvements, combinations, compositions, constructions, and elements obvious to those skilled in the art, are set forth in the appended claims.

I claim:

1. In golf ball construction, a tough durable age-resistant unpainted molded cover, the cover being white throughout its thickness, and the cover including balata, antioxidant material, sun proofing material and white coloring material.

2. In golf ball construction, a tough durable age-resistant unpainted vulcanized cover, the cover being white throughout its thickness, and the cover including balata, antioxidant material, sun proofing material and white coloring material.

3. In golf ball construction, a tough durable age-resistant unpainted molded cover, the cover being white throughout its thickness, and the cover including balata, rubber, antioxidant material, sun proofing material and white coloring material.

4. The golf ball construction defined in claim 3 in which the rubber includes at least one material selected from the group consisting of natural rubber and synthetic rubber.

5. The golf ball construction defined in claim 3 which includes at least 12 parts balata and up to 14 parts rubber, the rubber content including at least 30% natural rubber.

6. The golf ball construction defined in claim 3 containing at least 12 parts balata and up to 14 parts rubber, the rubber content consisting of at least 30% natural rubber and up to 70% high styrene butadiene.

7. In golf ball construction, a center, a rubber thread winding thereon, said center and winding being enclosed in a tough durable age-resistant unpainted molded cover, the cover being white throughout its thickness, and the cover being composed essentially of balata, natural rubber, high styrene butadiene, white coloring material, antioxidant material, sun proofing material, and a toughener.

8. A composition for use in the manufacture of tough durable age-resistant unpainted molded golf ball covers comprising at least 12 parts balata, up to 14 parts rubber, the rubber content including at least 30% natural rubber and the remainder high styrene butadiene, 0.23 part antioxidant material, 0.46 part sun proofing material, 7.6 parts titanium containing white coloring material, and 1.6 parts hydrated alumina.

9. In golf ball construction, a center, a rubber thread winding surrounding the center, a tough, durable, age-resistant unpainted molded cover white throughout its thickness surrounding the thread windings and center, the cover comprising twelve parts balata, fourteen parts rubber, said rubber consisting of 30% natural rubber and 70% high styrene butadiene, 0.23 part antioxidant, 0.46 part sunproof wax, 0.125 part sulphur, 0.1875 part accelerator, 0.075 part zinc, 1.6 parts hydrated alumina and 7.6 parts titanium white coloring material.

References Cited in the file of this patent

UNITED STATES PATENTS

| | | |
|---|---|---|
| 1,948,292 | Geer | Feb. 20, 1934 |
| 2,050,402 | Walsh | Aug. 11, 1936 |
| 2,109,948 | Olin | Mar. 1, 1938 |
| 2,143,544 | Crawford | Jan. 10, 1939 |
| 2,261,760 | Habgood | Nov. 4, 1941 |
| 2,643,125 | Juve | June 23, 1953 |

FOREIGN PATENTS

| | | |
|---|---|---|
| 494,031 | Great Britain | Oct. 19, 1938 |